United States Patent
Suh (10) Patent No.: US 10,271,208 B2
(45) Date of Patent: Apr. 23, 2019

(54) SECURITY SUPPORT METHOD AND SYSTEM FOR DISCOVERING SERVICE AND GROUP COMMUNICATION IN MOBILE COMMUNICATION SYSTEM

(71) Applicant: Samsung Electronics Co., Ltd, Gyeonggi-do (KR)

(72) Inventor: Kyungjoo Suh, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 15/111,469

(22) PCT Filed: Jan. 13, 2015

(86) PCT No.: PCT/KR2015/000355
§ 371 (c)(1),
(2) Date: Jul. 13, 2016

(87) PCT Pub. No.: WO2015/105402
PCT Pub. Date: Jul. 16, 2015

(65) Prior Publication Data
US 2016/0330619 A1    Nov. 10, 2016

(30) Foreign Application Priority Data
Jan. 13, 2014   (KR) .................. 10-2014-0004033

(51) Int. Cl.
*H04L 29/06* (2006.01)
*H04W 12/04* (2009.01)
(Continued)

(52) U.S. Cl.
CPC ......... *H04W 12/04* (2013.01); *H04L 63/0869* (2013.01); *H04L 63/0892* (2013.01);
(Continued)

(58) Field of Classification Search
None
See application file for complete search history.

(56) References Cited

U.S. PATENT DOCUMENTS

2008/0010242 A1* 1/2008 Jin .................. G06F 21/445
2013/0065526 A1    3/2013 Pottier et al.
(Continued)

FOREIGN PATENT DOCUMENTS

| WO | WO2013/095001 A1 | 6/2013 | |
|----|------------------|--------|---|
| WO | WO 2013/122374 A1 | 8/2013 | |
| WO | WO-2014208035 A1 * | 12/2014 | ............ H04L 9/088 |

OTHER PUBLICATIONS

International Search Report dated Mar. 11, 2015 in connection with International Patent Application No. PCT/KR2015/000355, 7 pages.
(Continued)

*Primary Examiner* — Eleni A Shiferaw
*Assistant Examiner* — Andrew J Steinle (57) ABSTRACT

The present disclosure relates to security schemes for device-to-device (hereinafter referred to as "D2D") discovery and D2D group communication in performing proximity based service (hereinafter referred to as "prose"), prose discovery, prose communication, and D2D group communication in a mobile communication network.

16 Claims, 7 Drawing Sheets

(51) Int. Cl.
　　　*H04W 8/00*　　　(2009.01)
　　　*H04W 12/06*　　(2009.01)
　　　*H04W 76/14*　　(2018.01)

(52) U.S. Cl.
　　　CPC .......... *H04L 63/104* (2013.01); *H04L 63/107*
　　　　(2013.01); *H04W 8/005* (2013.01); *H04W*
　　　　*12/06* (2013.01); *H04L 63/065* (2013.01);
　　　　　　　　　　　　　　　*H04W 76/14* (2018.02)

(56) References Cited

U.S. PATENT DOCUMENTS

| 2013/0244661 | A1  | 9/2013  | Lin et al. |           |
|--------------|-----|---------|------------|-----------|
| 2014/0335791 | A1* | 11/2014 | Kim ...................... | H04W 4/008 |
|              |     |         |            | 455/41.2  |
| 2014/0342735 | A1* | 11/2014 | Liao ........................ | H04W 8/04 |
|              |     |         |            | 455/435.1 |
| 2015/0043429 | A1  | 2/2015  | Kim et al. |           |
| 2015/0087233 | A1  | 3/2015  | Kim et al. |           |
| 2016/0065362 | A1* | 3/2016  | Choyi ................... | H04L 63/065 |
|              |     |         |            | 380/279   |

OTHER PUBLICATIONS

Written Opinion of the International Searching Authority dated Mar. 11, 2015 in connection with International Patent Application No. PCT/KR2014/000355, 5 pages.

* cited by examiner

SECURITY SUPPORT METHOD AND SYSTEM FOR DISCOVERING SERVICE AND GROUP COMMUNICATION IN MOBILE COMMUNICATION SYSTEM

TECHNICAL FIELD

The present invention relates to a security support method and device for discovering a service and group communication in a mobile communication system. More particularly, the present invention relates to a proximity based security support method, device, and system.

BACKGROUND ART

The technical field of the present invention is related to a system that enables a device to perform a communication function, and in this case, the device may include various devices, such as mobile communication terminals in the related art, devices that perform machine type communication, and consumer devices.

Currently, in performing device-to-device communication under a proximity based communication system structure in the related art, there exist vulnerability and other operational difficulties due to security exposure of terminal relation information. Further, in the current proximity based communication system, there is not enough discussion on systems and methods for security setting and management for device-to-device group communication, and thus problems of security vulnerability or inefficiency in performing the communication may occur.

DISCLOSURE OF INVENTION

Technical Problem

One subject to be achieved by the present invention is to provide a security support method and system for proximity based service (prose) discovery and group communication in an efficient mobile communication system.

Embodiments of the present invention provide schemes for enabling a device to perform device-to-device group communication in an evolved mobile communication system including 3GPP EPS and schemes for setting and managing security in the device-to-device group communication.

A device that intends to perform device-to-device group communication through embodiments of the present invention can perform safe communication by acquiring information for performing the device-to-device group communication, acquiring a security key for performing the device-to-device group communication, and setting security for performing the device-to-device group communication.

Accordingly, in a network environment, such as an Evolved Universal Terrestrial Radio Access Network (hereinafter referred to as "EUTRAN") or a Universal Terrestrial Radio Access Network (hereinafter referred to as "UTRAN")/GSM/EDGE Radio Access Network (hereinafter referred to as "GERAN"), the device can provide or receive information with respect to a terminal in a group through the present invention. In an embodiment of the present invention, the device receives security key related information to set prose related security for prose discovery and prose communication, and performs a security procedure using such a security key. Accordingly, in the prose discovery and prose communication, efficiency and security for the group communication can be enhanced.

Solution to Problem

In one aspect of the present invention, a communication method of a terminal in a network system that supports a proximity based service (prose) includes: collecting information related to prose communication; receiving a prose communication request from at least one adjacent terminal; determining whether the adjacent terminal is included in a prose group; and performing the prose communication with the adjacent terminal if the adjacent terminal is included in the prose group.

In another aspect of the present invention, a device of a terminal that performs communication in a network system that supports a proximity based service (prose) includes: a transceiver unit configured to perform data communication with at least one network node; and a control unit configured to collect information related to prose communication, to receive a prose communication request from at least one adjacent terminal, to determine whether the adjacent terminal is included in a prose group, and to perform the prose communication with the adjacent terminal if the adjacent terminal is included in the prose group.

In still another aspect of the present invention, a method for providing information of a proximity based service (prose) function in a network system that supports a prose includes: receiving a prose registration request message from at least one terminal; transmitting the prose registration request message to a Home Subscriber Server (HSS); receiving an authentication vector including a cipher key and an integrity key from the HSS; transmitting a prose authentication token to the terminal; transmitting a message including a response value to the authentication token from the terminal; and transmitting a message including an integrity key for prose communication security, an encryption key seed, a prose group identity, and a prose group key seed on the basis of the response value that is received from the terminal.

In yet still another aspect of the present invention, a proximity based service (prose) function in a network system that supports a prose includes: a transceiver unit configured to perform data communication with at least one network node; and a prose control unit configured to receive a prose registration request message from at least one terminal, to transmit the prose registration request message to a Home Subscriber Server (HSS), to receive an authentication vector including a cipher key and an integrity key from the HSS, to transmit a prose authentication token to the terminal, to transmit a message including a response value to the authentication token from the terminal, and to transmit a message including an integrity key for prose communication security, an encryption key seed, a prose group identity, and a prose group key seed on the basis of the response value that is received from the terminal.

Advantageous Effects of Invention

In accordance with the aspect of the present invention, it becomes possible to provide a security support method and system for proximity based service (prose) discovery and group communication with enhanced efficiency and security in a mobile communication system.

Further, in accordance with the aspect of the present invention, it becomes possible to provide proximity based security support method, device, and system.

Through the aspect of the present invention, it becomes possible that a device can provide or receive information with respect to a terminal group in an environment, such as an Evolved Universal Terrestrial Radio Access Network (hereinafter referred to as "EUTRAN") or a Universal Terrestrial Radio Access Network (hereinafter referred to as "UTRAN")/GSM/EDGE Radio Access Network (hereinafter referred to as "GERAN"). Further, since the device receives security key related information for setting prose related security for prose discovery and prose communication and performs a security procedure using such a security key, communication efficiency and security can be enhanced in the prose discovery and the prose communication.

MODE FOR THE INVENTION

Hereinafter, the operational principle according to preferred embodiments of the present invention will be described in detail with reference to the accompanying drawings. In describing the present invention, well-known functions or constructions incorporated herein are not described in detail since they would obscure the subject matter of the present invention in unnecessary detail. Further, all terms used in the description are defined in consideration of their functions in the present invention, but may differ depending on intentions of a user and an operator or customs. Accordingly, they should be defined on the basis of the contents of the whole description of the present invention.

The subject matter of the present invention to be described later is to provide schemes for enabling the above-described various devices that operate as User Equipment (UE) under a mobile communication system environment to perform mutual discovery, to perform mutual group communication with each other to transfer related information, to perform security procedure, and to perform safe communication.

Hereinafter, in describing the present invention in detail, 3GPP based EPS system, UTRAN, and GERAN will be used. However, the present invention is not certainly limited thereto, but can also be applied to other mobile network systems at the level of those skilled in the art.

On the other hand, in the case where the UE performs device-to-device group communication by receiving related information and security related information transferred thereto and performing a security procedure, various modifications may be made within a range that does not deviate from the scope of the present invention.

Figure 1:
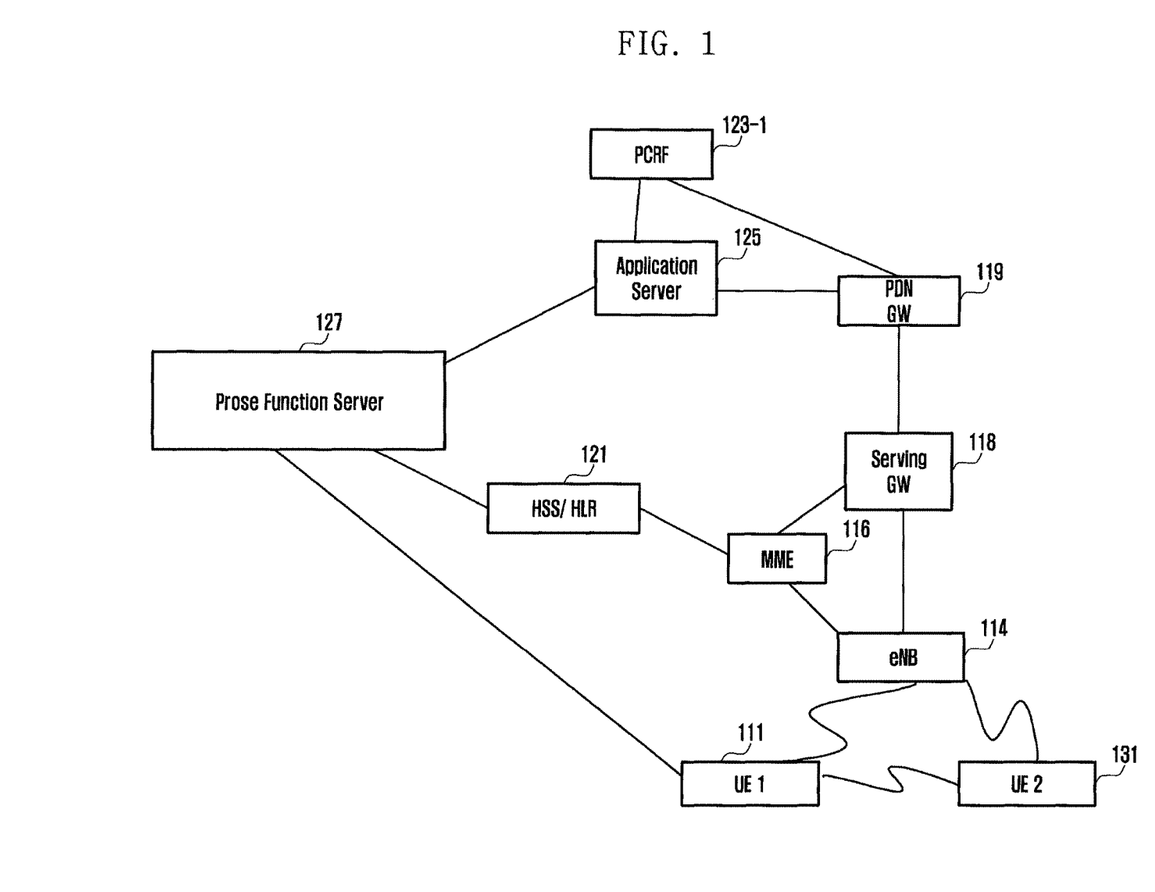
FIG. 1 is a diagram explaining a network environment according to an embodiment of the present invention.

Further, as shown in FIG. 1, an embodiment of the present invention proposes a management method that makes it possible to transfer related information, to perform a security procedure, and to perform safe communication when various devices including communication UE that is the basic object of the present invention intend to perform device-to-device group communication in an EUTRAN or 3GPP environment. This method can be applied to other mobile communication systems having a similar technical background and channel type, network architecture, a similar protocol, or a different protocol that performs similar operation with slight modifications in a range that does not greatly deviate from the scope of the present invention, and this may be possible through the judgment of those skilled in the art to which the present invention pertains.

An embodiment of the present invention is related to a proximity based service (hereinafter referred to as "prose"), that is, prose discovery and prose communication, in performing device-to-device communication. In particular, an embodiment of the present invention is related to a method and system for making it possible to perform safe communication in security by applying schemes for performing related information and security setting through group communication. The proximity based service may be used especially in a disaster situation (e.g., earthquake, tidal waves, tornado, or the like) in which it is difficult to perform rescue work through the existing infrastructure communication.

By performing the proximity based service proposed in an embodiment of the present invention, it may also be possible to play a role for public safety capable of transferring the disaster situation through the device-to-device group communication. However, in spite of such advantages, the proximity based service, unless it secures stability in security, may cause users of a specific group to suffer from a great confusion due to erroneous information that is caused by a malicious entity. Accordingly, security is much more important in performing the proximity service for public safety or group communication.

FIG. 1 is a diagram explaining a network environment according to an embodiment of the present invention.

Referring to FIG. 1, a network environment for security setting and prose communication for prose discovery and security setting for group communication in the prose communication will be described. Here, as an example, a 3GPP EPS system structure is illustrated. In the present invention, explanation will be made around the EUTRAN, and this method may be used even in other similar mobile communication systems.

Referring to FIG. 1, a device or User Equipment (UE) 111 may include various devices, such as mobile communication UE in the related art, devices that perform machine type communication, and consumer devices.

FIG. 1 illustrates an applicable environment in which UE 1 111 and UE 2 131 perform prose discovery and prose group communication. Hereinafter, the operation of the UE will be described around the operation of UE 1 111. However, the scope of the present invention is not limited to the UE 1 111, and the above-described prose operation could be applied to other devices or UE that perform the prose operation. The UE 1 111 may perform general EUTRAN communication through an evolved Node B (hereinafter referred to as "eNB") 114 and a Mobility Management Entity (hereinafter referred to as "MME") 116, and may perform data communication through a Serving Gateway (hereinafter referred to as "SGW") 118 and a Packet Data Network (PDN) Gateway (hereinafter referred to as "PGW") 119.

On the other hand, a prose function server 127 that performs prose related function may be used to perform the prose function. The prose function server 127 may verify prose related registration, transfer of related information, and prose related capability of the UE, and perform prose related function. On the other hand, a Home Subscriber Server (hereinafter referred to as "HSS") 121 may transfer subscription information related to the UE and UE related security key information. A prose related application server function may be performed through a prose application server 125. In order to perform such a prose application, the prose application server 125 may perform a prose related data service in association with a Policy and Charging Rules Function (PCRF) 123-1.

On the other hand, in a scenario in which a security key of the UE is generated and provided, the UE receives a private key and a public key from a certification authority 151.

Accordingly, in an embodiment of the present invention, a method, a device, and a system that can perform authentication, security and communication setting, and support of these operations will be described in order for entities, such as a device or UE 111, an evolved Node B (eNB), a Mobile Management entity (MME), a prose function, a Home Subscriber Server (HSS), and an application server, to perform proximity based service (prose), prose discovery, prose communication, and group communication.

Figure 2A:
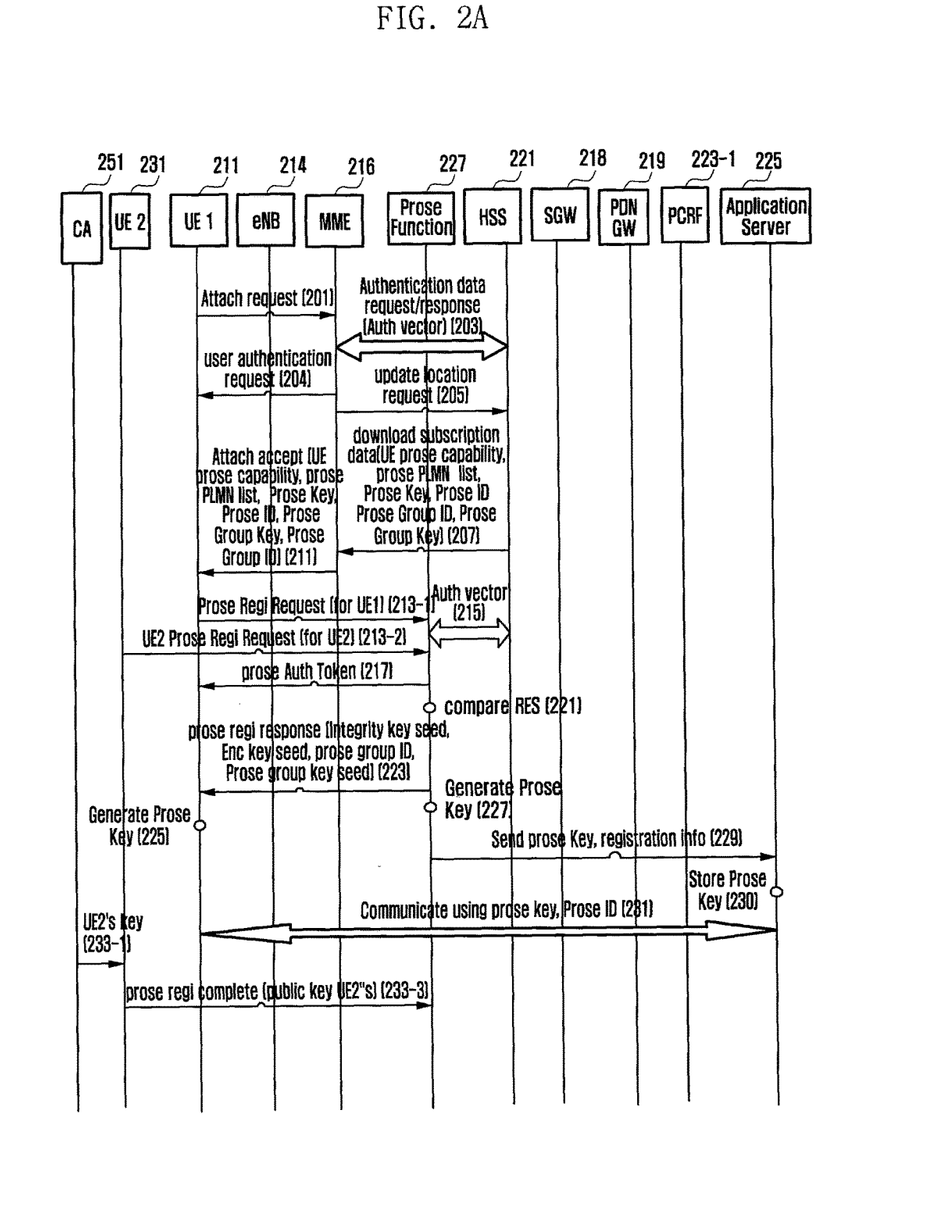
FIGS. 2A and 2B are diagrams explaining communication and security procedures for prose discovery and communication security of a prose communication group according to an embodiment of the present invention.
Figure 2B:
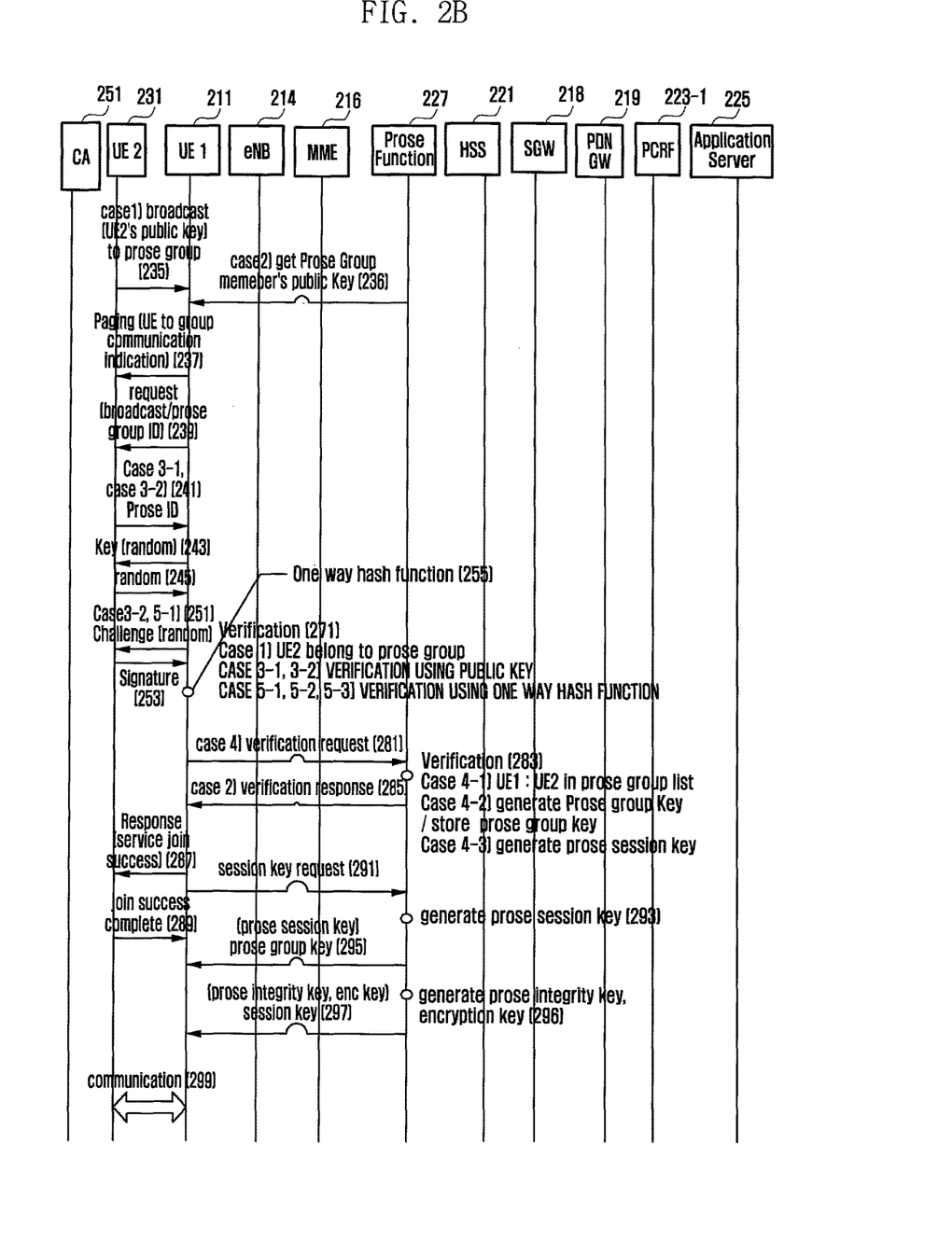

FIGS. 2A and 2B are diagrams explaining prose based communication and security method according to an embodiment of the present invention. Hereinafter, referring to FIGS. 2A to 2B, communication and security procedures for prose discovery and security of prose communication group communication will be described. In an embodiment of FIGS. 2A and 2B, a case where group prose discovery and prose communication are performed will be described. However, this is merely exemplary, and the scope of the present invention is not limited thereto.

At operation 201, UE 1 211 performs a registration procedure through transmission of an attach request message to eNB 214. The attach request message that is transmitted by the UE 1 211 is transferred to the MME 216.

At operation 203, the MME 216 transmits an authentication data request message to the HSS 221. The HSS 121 transmits security related information including an authentication vector to the MME 216. At operation 204, the MME 216 transmits a user authentication request message including an Authentication Token (AUTN) to the UE 1 211. The UE 1 211 transmits a Response Security value (RES) to the MME 216 together with a user authentication response message.

At operation 205, the MME 216 transmits an update location request message to the HSS 221. At operation 207, the HSS 221 transmits subscription data to the MME 216. In this case, the HSS 221 may also transfer information on a prose identity for performing a prose service, a prose group identity, a prose group key, a prose related capacity of the UE, a proximity related security key (prose key) if there exist registered prose identity and security key, and a prose Public Land Mobile Network (PLMN) list. The proximity related security key is a security key for proximity discovery or proximity communication. If there exists already registered information, the security key inquires and notifies of the registered information, whereas if there does not exist the registered information, the security key generates the information after authentication.

At operation 211, the MME 216 transmits an attach accept message to the eNB 214. The attach accept message is transmitted from the eNB 214 to the UE 1 211. At operation 211, the information that is transferred from the HSS 221 at operation 207, such as the prose identity for performing the prose service, the prose related capacity of the UE, the proximity related security key, the prose group key, the prose group identity, and the prose PLMN list, can be transferred together.

At operation 213-1, the UE 1 211 transmits a prose registration request message for requesting prose registration to the prose function 227. At operation 213-2, UE 2 231 also performs the prose registration request process (operation corresponding to operation 201 to operation 213) in the same manner as the UE 1 211. The subsequent process will be described around the operation of the UE1 211 under the assumption that the UE 2 231 passes through the registration process that is basically the same as the registration process of the UE 1211.

At operation 215, the prose function 227 transmits the prose registration request message to the HSS 221. Thereafter, the HSS 221 transmits a prose authentication vector to the prose function 227. The authentication vector may include a cipher key (hereinafter referred to as "CK") and an integrity key (hereinafter referred to as "IK"). At operation 217, the prose function 227 transmits a prose authentication token to the UE 1 211.

At operation 221, the UE 1 211 transmits a message, which includes a response value to the authentication token that is transmitted from the prose function 227 to the UE 1 211 for the prose registration, to the prose function 227. At operation 221, the prose function 227 verifies the RES and XRES information through comparison thereof with each other. At operation 223, the prose function 227 transmits a prose registration response message to the UE 1 211, and in this case, the integrity key, the encryption key seed, the prose group identity, and the prose group key seed are transmitted to protect the communication between the UE 1 211 and the application server 225.

At operation 225, the UE 1 211 may generate a prose key for prose communication, and the prose key is used for communication between the UE and the application. The prose key may be generated on the basis of the IK or the CK, or using the KASME. On the other hand, at operation 227, the prose function 227 may generate the prose key from the IK or the CK, or may generate the prose key from the KASME. In the case of generating the prose key from the IK or the CK, the prose function 227 may use the value that is transferred from the HSS 221, whereas in the case of generating the prose key from the KASME, the prose function 227 may receive the KASME from the MME 216, or the prose function 227 may be combined with the MME 216.

At operation 229, the prose function 227 transfers the prose key and related information that is registered for the prose service when the UE performs registration in the prose function 227 to the application server 225. Further, seed information for the integrity key and the encryption key may also be transferred.

At operation 230, at least one piece of information, such as the prose key, the integrity key seed, and the encryption key seed, may be stored in the application server 225. Thereafter, at operation 231, the UE 1 211 and the application server 225 perform communication using the prose key and the prose identity.

The subsequent processes are processes in which the UE performs prose group communication using the prose key or the prose Identity (ID), the prose group key, and the prose group Identity (ID).

Thereafter, at operation 271, the UE 2 231 may intend to verify the request that is transmitted for the prose communication through the public key as in case 3-1 and case 3-2. In this case, like operation 233-1, the UE 2 231 may register the public key of the UE 1 while transmitting a prose registration completion message to the prose function 227. For this, like operation 233-1, the UE 2 231 should receive its own private key and the public key from a Certification Authority (CA) 251. In the description of the embodiment of the present invention, the UE 2 231 is exemplified at operation 233-3. However, the UE 1 211 may also register the public key of the UE in the case of the verification using the public key.

On the other hand, like operation 235, in case 1, the UE 2 231 (or the UE 1 211 in the case of the verification using the public key of the UE 2 231) may notify the prose group of the public key. As such a public key notification method, a broadcast method may be used. Referring to an example of FIGS. 2A and 2B, the UE 2 231 may register its own public key in the prose function 227 through operation 233-3, and may transmit the registered public key to a prose group member in the broadcast method. The UE1 211 may be a member of the prose group.

Further, as another embodiment, like operation 236, in case 2, it may be also possible that the UE may receive the public key of a member that belongs to the prose group after completing the registration process of the prose key. That is, in an embodiment, the UE registers its own public key through the prose registration completion, and receives the public key of the member that belongs to the prose group. According to an embodiment of FIGS. 2A and 2B, the public key of the UE2 231 may be registered in the prose service or prose function 227, and the UE1 211 that is the member that belongs to the prose group may receive the public key that is registered in the prose service or prose function 227.

At operation 237, the UE 1 211 transmits a paging message. In this case, the paging message may include an indication for the prose group communication in the UE or a public safety communication indication. The operation 237 may not be performed depending on embodiments. On the other hand, at operation 239, the UE 1 211 may notify that the UE 1 wants to communicate with the prose group, and may transmit a request message for the prose communication. Such a request may be performed through a broadcast method or a method using a broadcast IP. In this case, a prose group Indication (ID) may be used to notify of a destination.

In the case of receiving the prose communication request from the UE1 211, it is required for the prose group to determine whether the prose group corresponds to a target prose node, and thus the prose group passes through verification procedures at operation 271 or at operations 281 to 285. At operation 271, in an embodiment, the verification of the group communication request is performed at the level of the UE. Operations 281 to 285 correspond to a case where the verification of the group communication request is performed at the level of the prose function 227.

According to an embodiment (case 1), the verification at operation 271 is to verify whether the target UE is the prose group. That is, the UE 1 211 verifies whether the target prose ID that has requested the prose communication is the prose group ID.

According to another embodiment (case 3-1 or case 3-2) at operation 271, the verification is performed using a public key. In detail, case 3-1 corresponds to the verification method using the public key, and includes a series of subsequent processes of 233-3→235→237→239→241→243→245→271→287. That is, at operation 241, the UE 2 231 transmits the prose ID of the UE 2 231 or the prose group ID to the prose group. At operation 243, nodes of the prose group transmit a random number that is encrypted with the public key of the UE 2 231 to the UE 2 231. Like operation 245, the UE 2 231 decrypts the random number with a private key of the UE 2 231 and transmits the decrypted random number to the prose group nodes to complete the verification.

According to still another embodiment (case 3-2), the verification is performed using a public key, and a transmitter is authenticated with a digital signature. That is, case 3-2 includes a series of processes of 233→235→237→239→241→251→253→271→287. At operation 251, the UE 1 211 transmits a random number to the prose group, and at operation 253, the prose group authenticates the random number with a signature using a private key of the prose group and transmits the authenticated random number for the verification at operation 271.

On the other hand, according to still another embodiment (case 5-1), the verification process in processes of 251→255→271 can be performed using one way hash function. In case 5-1, at operation 251, the UE 1 211 transmits the random number to the UE 2 231, and at operation 255, the UE 2 231 performs one way hash function using system time information, time stamp, or nonce with an input value that is at least one of a prose group key, a prose ID, a prose key, and prose group key using the one way hash function to the UE 1 211, and transmits the hash code value for the verification.

On the other hand, according to still another embodiment (case 5-2 or case 5-3), the verification process in processes of 255→271 can be performed using one way hash function. In case 5-2, a prose group key (case 5-2) or a symmetric key between prose groups (case 5-3) is used. For example, one way hash function is performed using the symmetric key of the UE 1 211 and the UE 2 231, and the hash code value is transmitted to be verified. In this case, as at operation 255, the UE 2 231 performs one way hash function using system time information, time stamp, nonce, or a concatenation thereof with an input value that is at least one of a prose group key, a prose ID, a prose key, and prose group key using the one way hash function to the UE 1 211, and transmits the hash code value for the verification.

According to still another embodiment, case 4 is composed of operation 281 to operation 285. That is, at operation 281, the UE 1 211 transmits a verification request to the prose function. Thereafter, at operation 283, the UE 1 211 verifies a prose group communication list. The prose group communication list is a list of UEs that belong to a prose group that can perform prose communication. At operation 283, the prose function 227 transmits a response to the verification to the UE 1 211. In this case, the prose function may transmit only information simply indicating whether the verification has succeeded.

At operation 283, various kinds of verifications may be performed. As an embodiment, in case 4-1, the prose function 227 verifies whether the UE 1 211 and the UE 2 231 exist in the same prose group list. As another embodiment, in case 4-2, the prose function 227 can generate a prose group key and store the generated prose group key. As still another embodiment, in case 4-3, the prose function 227 can generate a prose session key.

At operation 285, the prose function 227 transmits a verification response message to the UE. At operation 287, the UE 1 211 transmits a response message for notifying that the service join has succeeded to the UE 2 231. At operation 289, the UE 2 231 transmits a join success completion message for notifying that the group join has succeeded to the UE 1 211. At operation 291, the UE 1 211 requests a prose session key from the prose function 227. At operation 293, the prose function 227 generates a prose session key. At operation 295, the prose function 227 encrypts the generated prose session key with a prose group key to transmit the encrypted prose session key. At operation 296, the prose function 227 generates at least one of a prose integrity key or a prose encryption key. At operation 297, the prose function encrypts at least one of the prose integrity key or the prose encryption key with the prose session key and transmits the encrypted key to the UE 1 211. At operation 299, the UE 2 231 can perform communication with the group, for example, can perform group communication with the UE 1 211 that belongs to the group.

Figure 3:
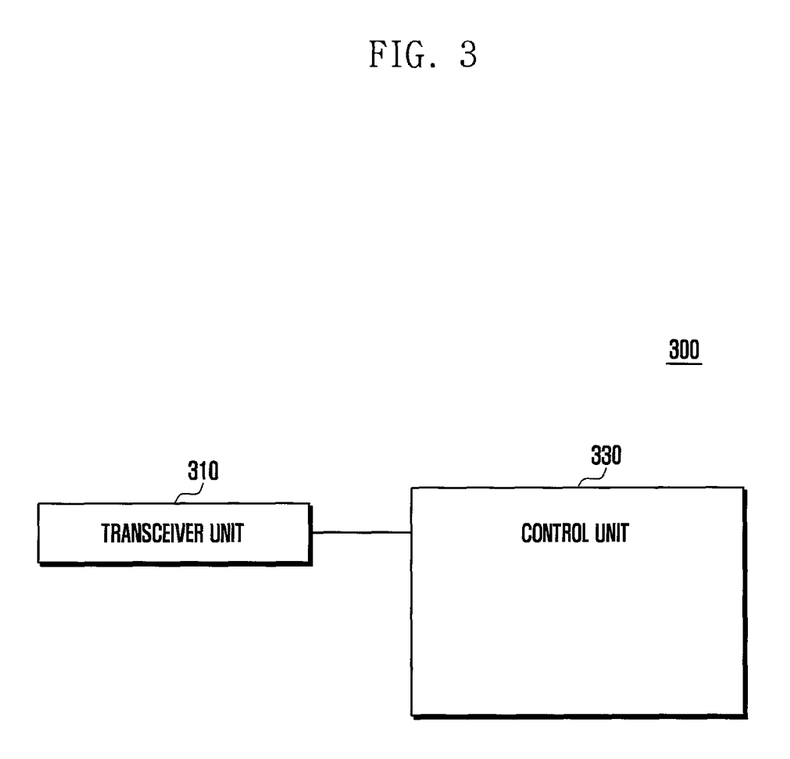
FIG. 3 is a diagram explaining a terminal according to an embodiment of the present invention.

FIG. 3 is a diagram explaining a terminal according to an embodiment of the present invention.

A terminal 300 may include a transceiver unit 310 that performs data communication with at least one network node, and a control unit 330 that controls the overall operation of the terminal.

In an embodiment of the present invention, the control unit 330 may operate to collect information related to prose communication, to receive a prose communication request from at least one adjacent terminal, to determine whether the adjacent terminal is included in a prose group, and to perform the prose communication with the adjacent terminal if the adjacent terminal is included in the prose group.

Further, the control unit 330 may operate to collect the prose communication related information by transmitting an attach request message, receiving an attach accept message including prose related information, transmitting a prose registration request message, receiving a prose registration response message, and generating a prose key for the prose communication.

In this case, the prose related information may include at least one of a prose identity, a prose related capacity of the terminal, a proximity related security key, a prose group key, a prose group identity, and a prose PLMN list.

Further, the prose registration response message may include at least one of an integrity key, an encryption key seed, a prose group identity, and a prose group key seed.

Further, the control unit 330 may operate to generate the prose key from the integrity key and the encryption key seed or to generate the prose key from a KASME that is received from a Mobility Management Entity (MME).

Further, the control unit 330 may operate to determine whether the adjacent terminal is included in the prose group using at least one of determination of whether a prose Identity (ID) of the adjacent terminal is included in a prose group Identity (ID), determination of the same using a public key of the adjacent terminal, and determination of the same using a one way hash function.

Further, the control unit 330 may operate to determine whether the adjacent terminal is included in the prose group by transmitting a verification request message to a prose function, and receiving a message including identification information indicating whether to perform verification from the prose function.

On the other hand, it is for convenience in explanation that the configuration of the terminal 300 is divided into blocks, and thus the configuration of the terminal 300 is not certainly limited thereto. Further, it would be apparent that the control unit 330 of the terminal can control the operations of the terminal as described above with reference to FIG. 2.

Figure 4:
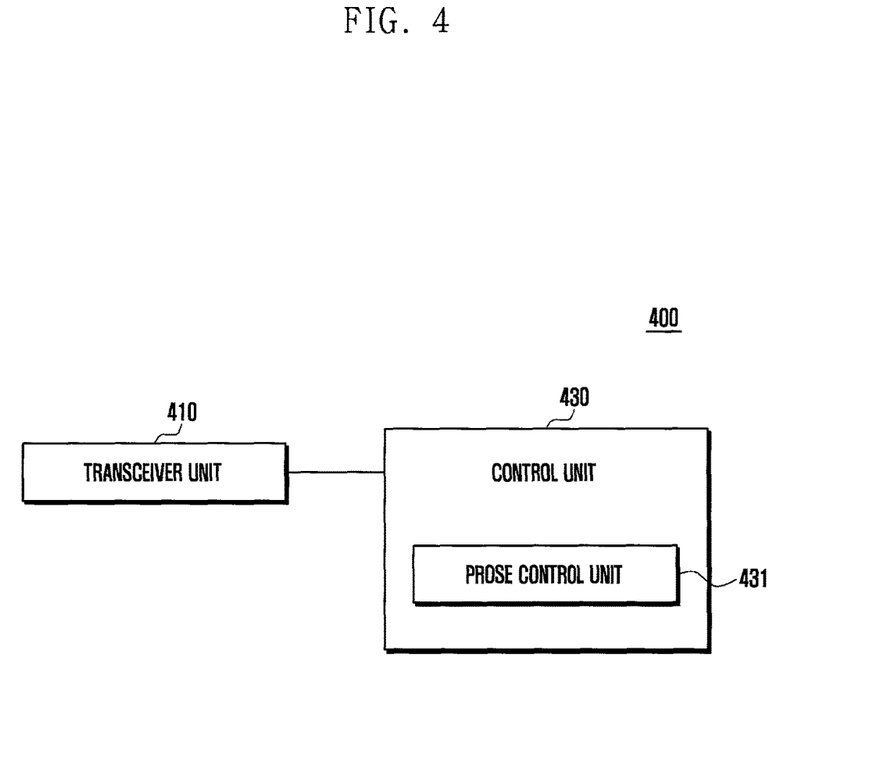
FIG. 4 is a diagram explaining a prose function according to an embodiment of the present invention.

FIG. 4 is a diagram explaining a prose function according to an embodiment of the present invention.

The prose function 400 may include a transceiver unit 410 that performs data communication with at least one network node, and a control unit 430 that controls the overall operation of the prose function 400. The control unit 430 may further include a prose control unit 431.

According to an embodiment of the present invention, the prose control unit 431 may operate to receive a prose registration request message from at least one terminal, to transmit the prose registration request message to a Home Subscriber Server (HSS), to receive an authentication vector including a cipher key and an integrity key from the HSS, to transmit a prose authentication token to the terminal, to transmit a message including a response value to the authentication token from the terminal, and to transmit a message including an integrity key for prose communication security, an encryption key seed, a prose group identity, and a prose group key seed on the basis of the response value that is received from the terminal.

Further, the prose control unit 431 may operate to receive a prose registration completion message including public key information from at least one adjacent terminal and to transmit the public key information to a member that belongs to a prose group.

Further, the prose control unit 431 may operate to receive a verification request message for at least one adjacent terminal from the terminal, to verify whether the adjacent terminal is included in a prose group on the basis of prose group list information and ID information of the adjacent terminal, and to transmit an indication including the result of the verification.

On the other hand, it is for convenience in explanation that the configuration of the prose function 400 is divided into blocks, and thus the configuration of the prose function 400 is not certainly limited thereto. It would be apparent that the control unit 430 can perform the operation of the prose control unit 431. Further, it would be apparent that the prose control unit 431 of the prose function can control the operations of the prose function as described above with reference to FIG. 2.

Figure 5:
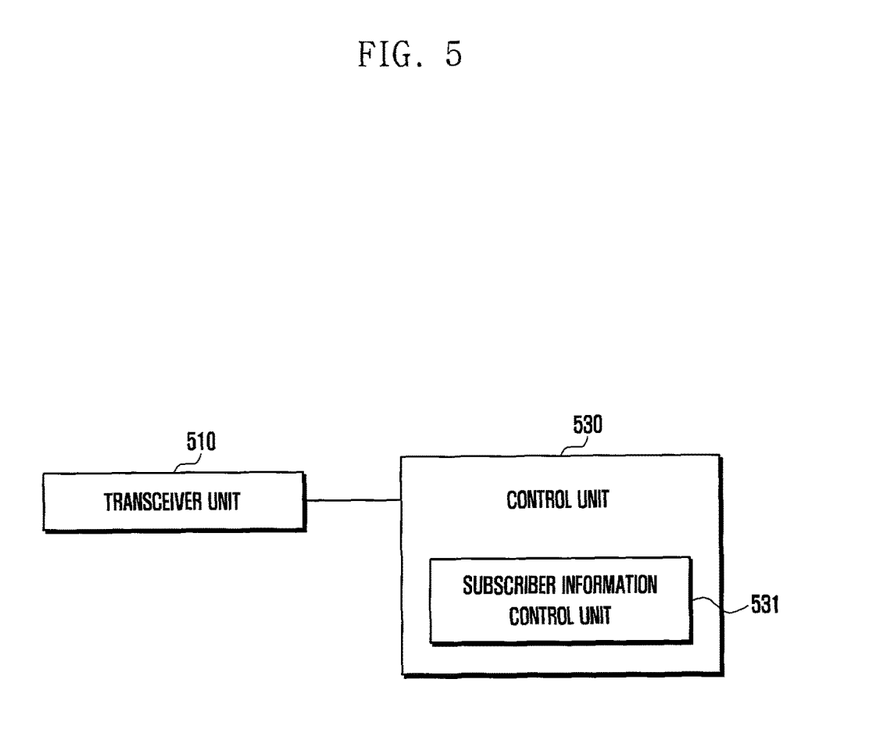
FIG. 5 is a diagram explaining an HSS according to an embodiment of the present invention.

FIG. 5 is a diagram explaining an HSS according to an embodiment of the present invention.

The Home Subscriber Server (HSS) 500 may include a transceiver unit 510 that performs data communication with at least one network node, and a control unit 530 that controls the overall operation of the HSS 500. Further, the control unit 530 may further include a subscriber information control unit 531.

The subscriber information control unit 531 may operate to receive an authentication data request message from an MME and to transmit security related information including an authentication vector to the MME on the basis of the received information.

The subscriber information control unit 531 may operate to receive an update location request message from the MME and to transmit subscription data to the MME 116. In this case, the subscriber information control unit 531 may also transfer information on a prose identity for performing a prose service, a prose group identity, a prose group key, a prose related capacity of the UE, a proximity related security key (prose key) if there exist registered prose identity and security key, and a prose PLMN list.

Further, the subscriber information control unit 531 may operate to receive a registration request message from the prose function and to transmit a prose authentication vector to the prose function corresponding to this.

On the other hand, it is for convenience in explanation that the configuration of the HSS 500 is divided into blocks, and thus the configuration of the HSS 500 is not certainly limited thereto. It would be apparent that the control unit 530 can perform the operation of the subscriber information control unit 531. Further, it would be apparent that the subscriber information control unit 531 of the HSS can control the operations of the HSS as described above with reference to FIG. 2.

Figure 6:
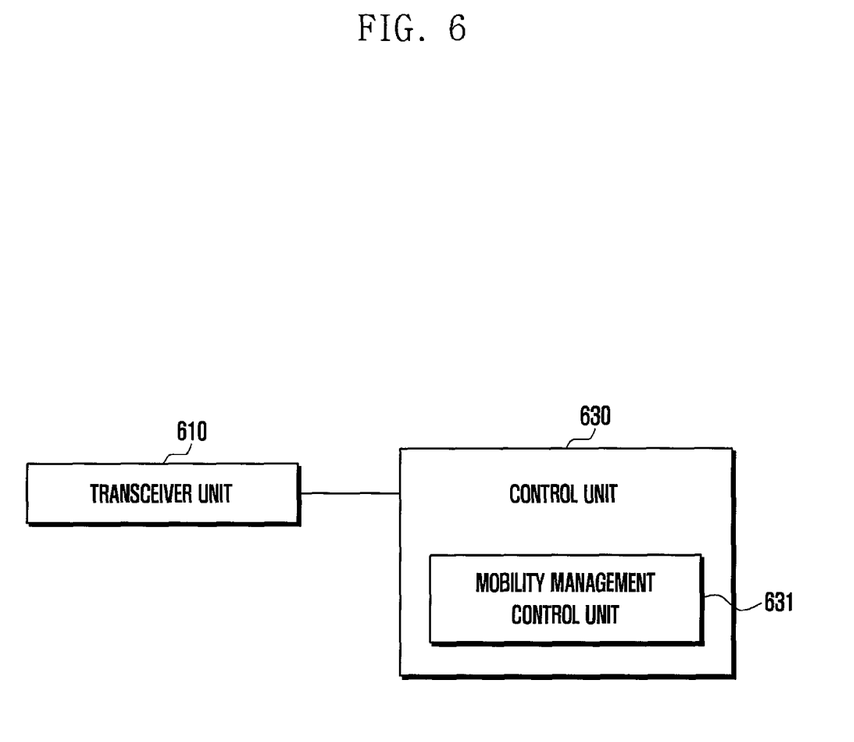
FIG. 6 is a diagram explaining an MME according to an embodiment of the present invention.

FIG. 6 is a diagram explaining an MME according to an embodiment of the present invention.

The Mobility Management Entity (MME) 600 includes a transceiver unit 610 that performs data communication with at least one network node, and a control unit 630 that controls the overall operation of the MME. Further, the control unit 630 may further include a mobility management control unit 631.

The mobility management control unit 631 may receive an attach request message that is transmitted by UE from eNB. Further, the mobility management control unit 631 may operate to transmit an authentication data request message to a HSS on the basis of the received attach request message. The mobility management control unit 631 may operate to receive security related information that includes an authentication vector from the HSS and to transmit a user authentication request message that includes an Authentication Token (AUTN) to the UE.

Further, the mobility management control unit 631 may operate to receive a Response Security value (RES) from the UE together with the user authentication request message. The mobility management control unit 631 may operate to transmit an update location request message to the HSS on the basis of a user authentication response message and to receive subscription information data from the HSS.

Thereafter, the mobility management control unit 631 may operate to transmit an attach accept message to the eNB. The attach accept message may be transmitted from the eNB 114 to the UE 111.

On the other hand, it is for convenience in explanation that the configuration of the MME 600 is divided into blocks, and thus the configuration of the MME 600 is not certainly limited thereto. It would be apparent that the control unit 630 can perform the operation of the mobility management control unit 631. Further, it would be apparent that the mobility management control unit 631 can control the operations of the MME as described above with reference to FIG. 2.

Meanwhile, preferred embodiments of the present invention disclosed in this specification and drawings and specific terms used therein are illustrated to present only specific examples in order to clarify the technical contents of the present invention and help understanding of the present invention, but are not intended to limit the scope of the present invention. It will be evident to those skilled in the art that various implementations based on the technical spirit of the present invention are possible in addition to the disclosed embodiments.

The invention claimed is:

1. A communication method of a first terminal in a network system that supports a proximity based service (prose), comprising:
   receiving a prose authentication token from a prose function;
   transmitting a message including a response value corresponding to the prose authentication token to the prose function;
   receiving a message including an integrity key for prose communication security, an encryption key seed, a prose group identity, and a prose group key seed based on the response value;
   receiving a prose communication request from a second terminal;
   determining whether the second terminal is included in a prose group; and
   performing prose communication with the second terminal if the second terminal is included in the prose group.

2. The communication method of claim 1, further comprising:
   transmitting an attach request message; and
   receiving an attach accept message including prose related information.

3. The communication method of claim 2, wherein the prose related information includes at least one of a prose identity, a prose related capacity of the first terminal, a proximity related security key, a prose group key, the prose group identity, and a prose PLMN list.

4. The communication method of claim 1, further comprising:
   receiving public key information of the second terminal from the prose function, wherein the public key information of the second terminal is registered at the prose function based on a prose registration completion message received from the second terminal,
   wherein whether the second terminal is included in the prose group is determined based on the public key information of the second terminal.

5. The communication method of claim 1, further comprising:
   determining whether a prose identity of the second terminal is included in the prose group identity; or
   determining whether the second terminal is included in the prose group based on a one way hash function.

6. The communication method of claim 1, further comprising:
   transmitting a verification request message to the prose function; and
   receiving a message including identification information indicating whether to perform verification from the prose function.

7. A first terminal in a network system that supports a proximity based service (prose), comprising:
   a transceiver; and
   a controller coupled with the transceiver and configured to:
   receive a prose authentication token from a prose function,
   transmit a message including a response value corresponding to the prose authentication token to the prose function,
   receive a message including an integrity key for prose communication security, an encryption key seed, a prose group identity, and a prose group key seed based on the response value,
   receive a prose communication request from a second terminal,
   determine whether the second terminal is included in a prose group based on public key information of the second terminal, and
   perform prose communication with the second terminal if the second terminal is included in the prose group.

8. The first terminal of claim 7, wherein the controller is further configured to:

transmit an attach request message, and receive an attach accept message including prose related information.

9. The first terminal of claim 8, wherein the prose related information includes at least one of a prose identity, a prose related capacity of the first terminal, a proximity related security key, a prose group key, the prose group identity, and a prose PLMN list.

10. The first terminal of claim 7, wherein the controller is further configured to receive public key information of the second terminal from the prose function, wherein the public key information of the second terminal is registered at the prose function based on a prose registration completion message received from the second terminal, and wherein whether the second terminal is included in the prose group is determined based on the public key information of the second terminal.

11. The first terminal of claim 7, wherein the controller is further configured to:

determine whether a prose identity of the second terminal is included in the prose group identity, or determine whether the second terminal is included in the prose group based on a one way hash function.

12. The first terminal of claim 7, wherein the controller is further configured to:

determine whether the second terminal is included in the prose group by transmitting a verification request message to the prose function, and receive a message including identification information indicating whether to perform verification from the prose function.

13. A method for providing information of a proximity based service (prose) function in a network system that supports a prose, comprising:

receiving a prose registration request message from a first terminal;

transmitting the prose registration request message to a Home Subscriber Server (HSS);

receiving an authentication vector including a cipher key and an integrity key from the HSS;

transmitting a prose authentication token to the first terminal;

receiving a message including a response value corresponding to the prose authentication token from the first terminal;

transmitting a message including the integrity key for prose communication security, an encryption key seed, a prose group identity, and a prose group key seed based on the response value that is received from the first terminal;

receiving a prose registration completion message including public key information from a second terminal; and transmitting the public key information to a member that belongs to a prose group.

14. The method of claim 13, further comprising:

receiving a verification request message for the second terminal from the first terminal;

verifying whether the second terminal is included in the prose group based on prose group list information and ID information of the second terminal; and transmitting an indication including a result of the verification.

15. A proximity based service (prose) function in a network system that supports a prose, comprising:

a transceiver; and a controller coupled with the transceiver and configured to:

receive a prose registration request message from a first terminal, transmit the prose registration request message to a Home Subscriber Server (HSS), receive an authentication vector including a cipher key and an integrity key from the HSS, transmit a prose authentication token to the first terminal, receive a message including a response value corresponding to the prose authentication token from the first terminal, transmit a message including the integrity key for prose communication security, an encryption key seed, a prose group identity, and a prose group key seed based on the response value that is received from the first terminal, receive a prose registration completion message including public key information from a second terminal, and transmit the public key information to a member that belongs to a prose group.

16. The prose function of claim 15, wherein the controller is further configured to:

receive a verification request message for the second terminal from the first terminal, verify whether the second terminal is included in the prose group based on prose group list information and ID information of the second terminal, and transmit an indication including a result of the verification.

* * * * *